US011709942B2

(12) United States Patent
McIntosh et al.

(10) Patent No.: US 11,709,942 B2
(45) Date of Patent: Jul. 25, 2023

(54) GENERATING PROTECTION BARRIER INSTRUCTIONS FOR EXECUTABLE CODE

(71) Applicant: International Business Machines Corporation, Armonk, NY (US)

(72) Inventors: Ronald Ian McIntosh, Scarborough (CA); Joanne Minish, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 16/601,688

(22) Filed: Oct. 15, 2019

(65) Prior Publication Data
US 2021/0110046 A1 Apr. 15, 2021

(51) Int. Cl.
*G06F 21/57* (2013.01)
*G06F 8/41* (2018.01)

(52) U.S. Cl.
CPC .............. *G06F 21/577* (2013.01); *G06F 8/41* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 8,195,953 B1 * | 6/2012 | Yue | ........................ | G06F 21/566 726/22 |
| 9,436,603 B1 * | 9/2016 | Pohlack | .............. | G06F 12/0808 |
| 2006/0230289 A1 * | 10/2006 | Fox | ........................ | G06F 21/563 713/188 |
| 2007/0074169 A1 * | 3/2007 | Chess | ...................... | G06F 21/54 717/124 |
| 2010/0205673 A1 * | 8/2010 | Burrell | .................... | G06F 21/54 726/25 |
| 2010/0295673 A1 * | 11/2010 | Ahmad | ................. | H04L 67/125 340/539.1 |
| 2017/0185784 A1 * | 6/2017 | Madou | ................ | H04L 63/1433 |

(Continued)

OTHER PUBLICATIONS

"Cache Speculation Side-channels." Retrieved from Internet using: https://developer.arm.com/support/arm-security-updates/speculative-processor-vulnerability/download-the-whitepaper, Jul. 2018, 20 pages.

(Continued)

*Primary Examiner* — Fatoumata Traore
(74) *Attorney, Agent, or Firm* — Cantor Colburn LLP; Teddi Maranzano (57) ABSTRACT

Provided are embodiments that include a system configured to generate executable code with protection barrier instructions. The system includes a storage medium, the storage medium being coupled to a processor. The processor is configured to analyze code, mark one or more potentially unsafe instructions in the code, and identify one or more unsafe instructions from the marked one or more potentially unsafe instructions in the code. The processor is also configured to insert a protection barrier instruction into the code based at least in part on identifying the one or more unsafe instructions, and translate the code, responsive to inserting the protection barrier instruction. Also provided are embodiments for a computer-implemented method and a computer program product for generating executable code with protection barrier instructions.

17 Claims, 4 Drawing Sheets

(56) References Cited

U.S. PATENT DOCUMENTS

2017/0316202 A1* 11/2017 Roichman .............. G06F 21/54
2021/0011985 A1* 1/2021 Korotaev ............. G06F 21/126

OTHER PUBLICATIONS

"Reading privileged memory with a side-channel." Retrieved from Internet using: https://googleprojectzero.blogspot.com/2018/01/reading-privileged-memory-with-side html, 2018, 30 pages.
"Site Isolation." Retrieved from Internet using: https://www.chromium.org/Home/chromium-security/site-isolation, 5 pages.
Andrew Pardoe, "Spectre mitigations in MSVC." Retrieved from Internet using: https://blogs.msdn.microsoft.com/vcblog/2018/01/15/spectre-mitigations-in-msvc/, 2018, 7 pages.
Khaled N. Khasawneh, et al. "SafeSpec: Banishing the Spectre of a Meltdown with Leakage-Free Speculation," arXiv preprint arXiv:1806.05179 (2018), 12 pages.
Nikolay A. Simakov, et al. "Effect of Meltdown and Spectre Patches on the Performance of HPC Applications," arXiv preprint arXiv:1801 04329 (2018), 8 pages.
Paul Kocher, et al., "Spectre attacks: Exploiting speculative execution," arXiv preprint arXiv:1801.01203 (2018), 16 pages.
Vladimir Kiriansky, et al., "DAWG: A Defense Against Cache Timing Attacks in Speculative Execution Processors." Retrieved from Internet using: https://eprint.iacr.org/2018/418.pdf., 2018, 16 pages.

\* cited by examiner

GENERATING PROTECTION BARRIER INSTRUCTIONS FOR EXECUTABLE CODE

BACKGROUND

The present invention generally relates to computer systems, and more specifically to compilers or other translators that generate executable code for computer systems.

In today's environment, modern computers have made substantial advances. Dramatic advances in both hardware and software (e.g., computer programs) have drastically improved the performance of computer systems. Several hardware design aspects have allowed significant performance improvements including cache memory and various speculative execution and prediction techniques. There may be a need to improve the security of data as the computer systems advance.

SUMMARY

Embodiments of the present invention are directed to a computer-implemented method for generating protection barrier instructions for executable code for computer systems. A non-limiting example of the computer-implemented method includes analyzing code, marking one or more potentially unsafe instructions in the code, and identifying one or more unsafe instructions from the marked one or more potentially unsafe instructions in the code. The computer-implemented method also includes inserting a protection barrier instruction into the code based at least in part on identifying the one or more unsafe instructions, and translating the code responsive to inserting the protection barrier instruction.

Embodiments of the present invention are directed to a system for generating protection barrier instructions for executable code for computer systems. A non-limiting example of the system includes a storage medium, where the storage medium being coupled to a processor. The processor is configured to analyze code, mark one or more potentially unsafe instructions in the code, and identify one or more unsafe instructions from the marked one or more potentially unsafe instructions in the code. The processor is also configured to insert a protection barrier instruction into the code based at least in part on identifying the one or more unsafe instructions, and translate the code, responsive to inserting the protection barrier instruction.

Embodiments of the invention are directed to a computer program product for generating protection barrier instructions for executable code for computer systems, the computer program product comprising a computer readable storage medium having program instructions embodied therewith. The program instructions are executable by a processor to cause the processor to perform a method. A non-limiting example of the method includes analyzing code, marking one or more potentially unsafe instructions in the code, and identifying one or more unsafe instructions from the marked one or more potentially unsafe instructions in the code. The method also includes inserting a protection barrier instruction into the code based at least in part on identifying the one or more unsafe instructions, and translating the code responsive to inserting the protection barrier instruction.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, some of the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The term "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, modern computer systems are equipped with cache memory which improves the performance of the computer system. Cache is used to store data that is frequently accessed from main memory so that subsequent requests for the particular data are accessed from the cache instead of main memory.

Computer systems also perform conditional branch prediction and speculative execution to increase efficiency. To improve performance, one or more circuits can be used to keep track of which branch direction was more likely to be chosen when handling previous data at that point. The processor can predict the branch direction that will likely be executed based on the history. Responsive to making the prediction, instructions for that path are fetched and execution of those instructions is started. This execution is speculative because the branch direction prediction may have been wrong.

When the processor determines that the conditional branch either should or should not have been taken, the branch direction is resolved, and some clean up may be needed. If the prediction direction was correct then the speculatively executed instructions are made final and the calculated values are used. On the other hand, if the predicted direction was incorrect then the speculatively executed instructions are undone, the results are discarded, and execution continues on the correct path. When the branch prediction is reasonably accurate, speculative execution can significantly improve execution speed.

Another technique that is used to improve computer system performance is indirect branching or call target prediction, where the place the branch or call will go to depends on its input data. Indirect branching and indirect calls can benefit from prediction. Branch prediction can predict whether the branch or call will or will not be taken.

In addition, most modern computers have branch target prediction and/or call target prediction which predicts what target address the branch or call should go to or call. While waiting for the correct address to be determined, speculative execution continues at the predicted address; when the correct address is known either the speculatively executed instructions will be finalized (or retired, or completed), or they will be discarded.

To improve performance, circuits can keep track of which branch target has been more likely when handling previous data, and the processor predicts that it will likely execute the path this current time before it is sure of the data to be executed.

In the event the speculative execution was incorrect, the speculatively executed instructions are undone, the results are discarded and the execution continues on the correct path. When speculatively executed instructions are undone, there may be side effects that are not undone because cleaning them up would be difficult or expensive. The side effect of interest here is that when data is speculatively brought from main memory into any level of cache, it is not removed if the speculative instructions are undone. If more than one instruction speculatively brought data into the cache, then multiple blocks of data are left in the cache, even though they turned out not to have been needed.

When speculatively cached data is left around, techniques exist for other programs (spy programs) running at the same time to use one bit of that data belonging to the victim to affect the spy's own speed accessing the cache, allowing the spy to deduce whether that bit of the victim's data was a 0 or 1. Additional observations can determine the value of the next bit, and the next bit, until all of the victim's speculatively cached data has been copied by the spy program. More complex techniques can copy all of the victim's data. This technique can be extended to use two or more bits, or an 8-bit byte, or 16-bit halfword, to collect data more quickly and also to defeat program analysis looking for dangerous code patterns. All of the victim program's data can be copied by the spy program. This is an example of a covert communication channel or a side channel. There may be a need to ensure the security for each program's data.

Some programs have multiple tasks or threads running in parallel. Usually those threads share data and work together, but in some cases their data is private just as separate programs' data is private. An example is that a web browser may simultaneously access multiple web sites, and it is unacceptable for one web site to use data related to another, such as a game stealing a user's email or passwords. Herein only separate programs are described, but the same issues sometimes apply to threads within a single program.

Turning now to an overview of the aspects of the invention, one or more embodiments of the invention address the above-described shortcomings of the prior art by providing a technique to identify potential unsafe instructions and insert protection barrier instructions into the program to ensure unauthorized programs cannot monitor the current program's activity.

The above-described aspects of the invention address the shortcomings of the prior art by generating speculation protection barrier instructions based on analyzing executable code that can expose data that has been transferred between main memory and cache to unauthorized programs.

Figure 1:
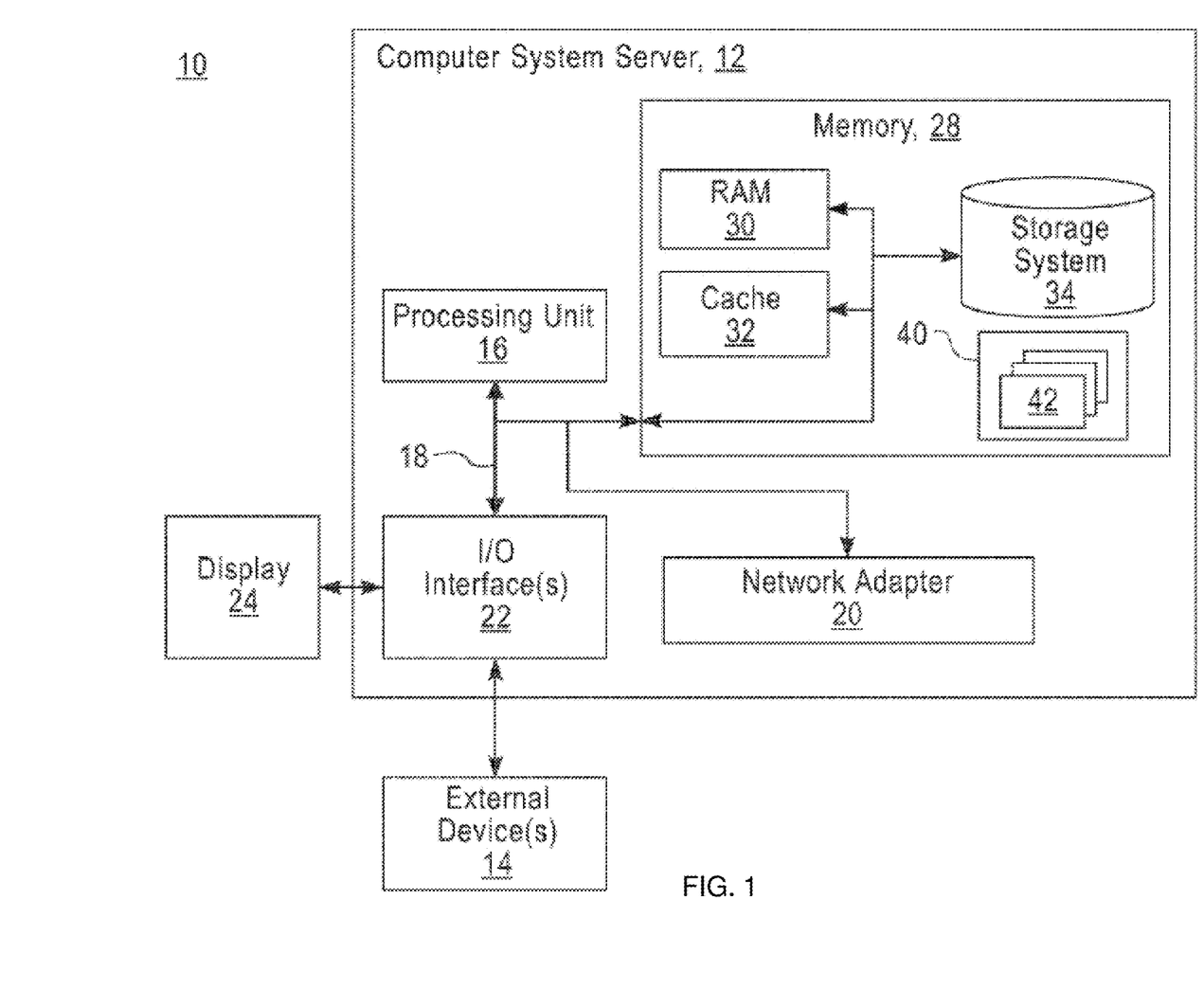
FIG. 1 depicts a generic processing system for implementing the processes described herein.

Turning now to a more detailed description of aspects of the present invention, FIG. 1 depicts a schematic of an example of a computing node. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, tape drives, and data archival storage systems, etc.

Figure 2:
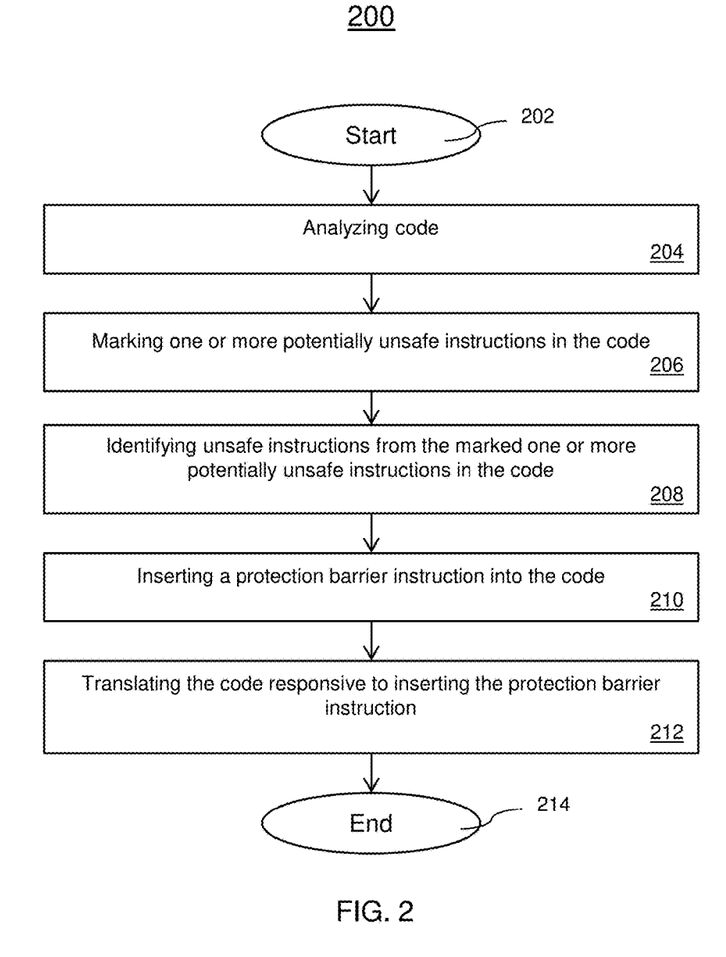
FIG. 2 depicts a flowchart of a method for generating protection barrier instructions for executable code in accordance with one or more embodiments of the invention.

Now referring to FIG. 2, a flowchart for a method 200 for generating protection barrier instructions for code for a computer system begins at block 202 and continues to block 204 which provides for analyzing code. In one or more embodiments, a processor receives and analyzes the code to identify the terms in the code. The code can be analyzed for any known coding language to identify various information including instructions and data. In one or more embodiments of the invention, the analysis is performed during a compilation process of the code. For example, the code and be processed into an intermediate form which must be further compiled and assembled before the compiled code is executable. The executable code can then be run on a computing system such as that shown in FIGS. 1 and 3 where the system includes a cache memory system.

The method 200 at block 206 identifies one or more potentially unsafe instructions in the code. For example, certain load instructions can be identified as potentially unsafe instructions as described below. The load instructions can be potentially unsafe because they can allow a spy program or unauthorized program to monitor the data that is loaded into a cache from main memory. In addition, an unauthorized program may provide instructions to cause load instructions to be speculatively executed and the unauthorized program monitors the activity. By monitoring the activity, the unauthorized program can begin to obtain data through the side channel.

In one or more embodiments of the invention, the one or more potentially unsafe instructions are marked during translation. For example, the load instructions can be marked to identify a candidate for inserting a protection barrier instruction. In addition, other potentially unsafe instructions can be marked and processed in accordance with one or more embodiments of the invention.

Subsequently, the marked instructions are further analyzed to determine whether further protection is recommended or required. If it determined that further protection is required, a protection barrier instruction can be added to the translated code. The protection barrier instruction can be added prior to the marked instruction or subsequent to the marked instruction. In some embodiments, protection barrier instructions can be added before and after the marked instruction. The placement of the protection barrier instructions can be based on the programmable language and/or internal architecture of the computer model(s) the program is to be executed on.

The method 200 at block 208 identifies unsafe instructions from the marked one or more potentially unsafe instructions in the code. In one or more embodiments of the invention, the unsafe instructions are identified from a set of marked potentially unsafe instructions. In one or more embodiments of the invention, particular types of load instructions can be identified and used to determine potentially unsafe instructions. For example, load instructions of the source code can be analyzed to determine whether the load instruction refers to memory using a base register, or an offset (displacement) added to a base register, or as an index (subscript) register added to a base register, or as both an offset and an index register added to a base register.

A load instruction with no index register, with or without an offset, is considered safe if the base register is the stack pointer or the frame pointer. The stack frame is the dynamically allocated memory for the current function to use. Generally, the stack pointer register points at its low end and the frame pointer to the high end. Typically the frame pointer is only needed if the stack frame may be grown while the function is executing.

A load instruction whose base register is the global offset table (GOT), table of contents (TOC), global section pointer, binding section pointer or equivalent is considered safe. Also, a load instruction whose base register is the GOT/TOC/binding section/global section, which uses an offset but does not use an index register and is not referring to data in the TOC is safe. Load instructions for data in the TOC can be considered safe. On the other hand, load instructions using data in the TOC as a base register can be considered unsafe, and load instructions using index registers or base registers loaded from pointer variables are unsafe.

If all computer model(s) the user has specified that the program will be run on are known to protect programs from part of the security problem, then some of the load instructions identified herein as unsafe may be marked safe. It is to be understood that other rules may be needed for specific computer models and/or for specific programming languages and the rules are not limited to those described herein. Whether a barrier instruction is needed before or after or both before and after also depends on the specific computer model and/or for specific programming languages.

At block 210, the method 200 inserts a protection barrier instruction into the code. In one or more embodiments of the invention, the protection barrier instructions can prevent the processor from performing speculative execution of instructions to prevent the unauthorized program from obtaining data from the side channel. Block 212 translates the code responsive to inserting the protection barrier instruction. That is, a compiler or translator can be used to convert the source code from a programming language to a sequence of instructions that run on the chip on the computer system.

The protection barrier instruction protects the load instruction and is generated when the internal programming language is being translated to the final machine code, so the speculation barrier instruction is not separated and the order is not reversed from the load instructions by other transformations such as optimization. In addition, other mechanisms can be used. During execution of the code, which can be performed on computer systems such as that shown in FIGS. 1 and 3 where the computer systems include a cache memory, the speculation barrier instructions that have been inserted into the code will prevent the processor from performing speculative execution.

In FIG. 2, the method 200 ends at block 214. It should be understood that other steps can be included within the scope of the method 200. In addition, the method 200 can be applied to a variety of instructions including for example store instructions which are not part of the Spectre 1 security problem but which on some computer models may also present dangers to the computer system. Additional embodiments can include rules that can be applied to memory-to-memory instructions. For example, this can include memory move or memory compare instructions.

Additional embodiments can include allowing programs whose data is of low importance or where all programs running on a computer are trusted may not require additional security measures not inserting the protection barrier instructions.

Figure 3:
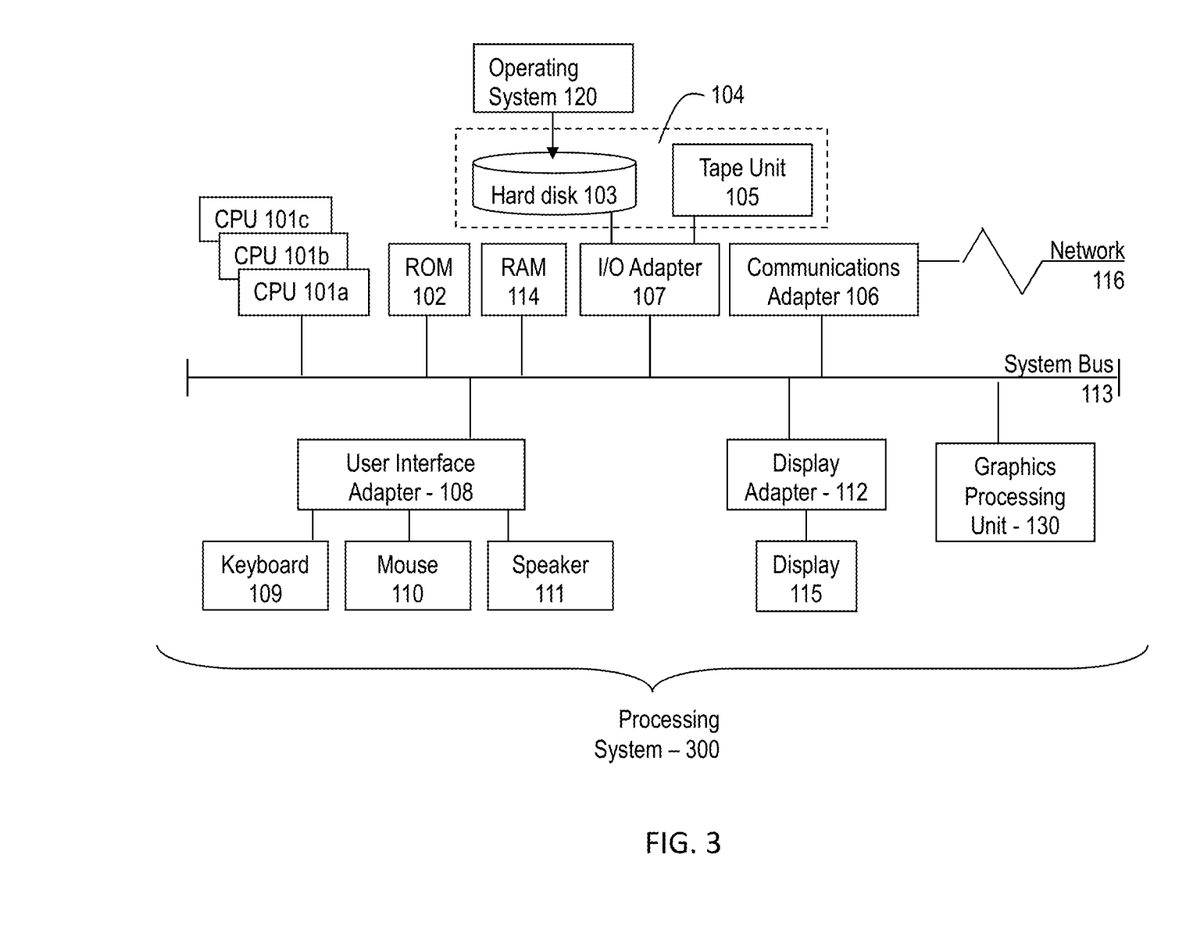
FIG. 3 depicts a system for practicing the invention described herein in accordance with one or more embodiments.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Figure 4:
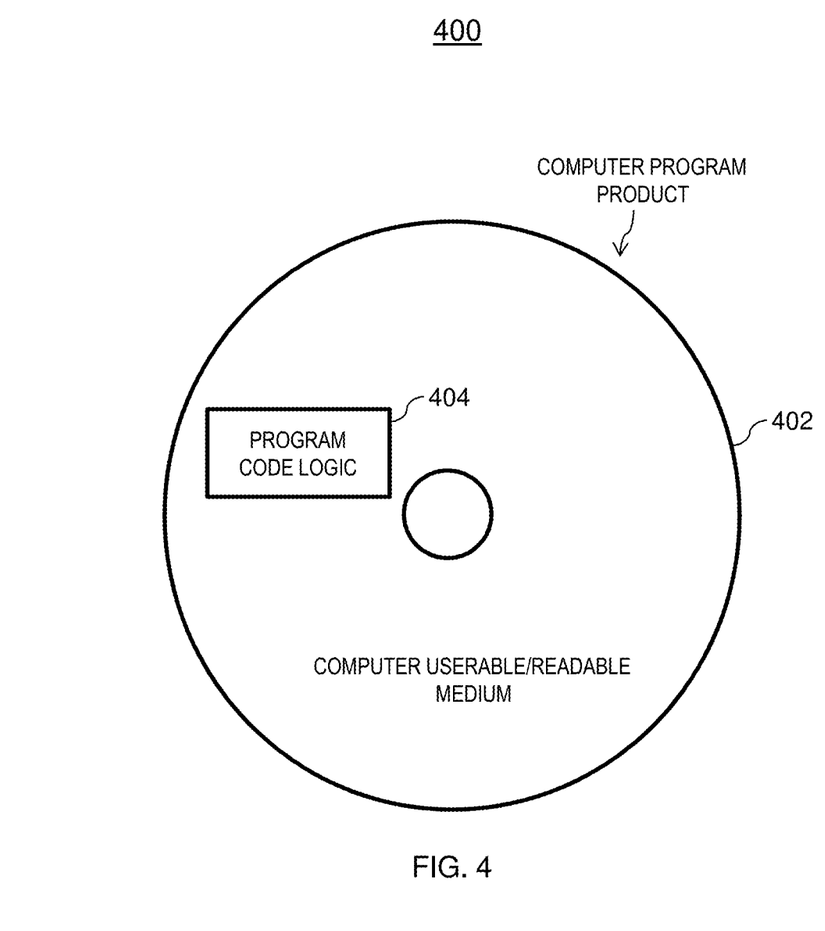
FIG. 4 depicts a computer program product used for generating protection barrier instructions for executable code in accordance with one or more embodiments of the invention.

Referring now to FIG. 4, a computer program product 400 in accordance with an embodiment that includes a computer-readable storage medium 402 and program instructions 404 is generally shown.

In other mitigation approaches, vendors can disable or eliminate high resolution clocks and add random "fuzz" value to lower resolution clocks. Other mitigation approaches can include rewriting conditional branches in order to avoid speculative execution or use a speculation barrier on paths between the conditional branches and any load instructions they appear to but are not actually protecting. Other mitigation approaches can include disabling the speculative execution for one or more programs in the computer system. However, these are only partial solutions, and unlike the complete solution described herein.

Other mitigation approaches can require hardware changes that include redesigning the hardware to selectively control speculation or to control its side effects. However, this particular mitigation approach is unworkable on current computer models.

The techniques described herein in accordance with one or more embodiments of the invention prohibit unauthorized programs from monitoring data used by another current program, thereby, protecting each program's data from other unauthorized programs unless explicit permission is granted. The technical effects and benefits include a means for implementing security in a computer system to prevent unauthorized programs from gaining access to another program's data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. One or more embodiments of the invention may also be used where the source language is machine language instead of a programming language; for example, in a tool to translate from one machine language to another, or in a tool to apply whole-program optimization, or in a program to insert instrumentation instructions to measure a program's performance, or in a tool to add protection to an unprotected program. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for generating executable code with protection barrier instructions, the computer-implemented method comprising:
   analyzing code to identify potentially unsafe instructions, wherein a load instruction using data in a table of contents (TOC) as a base register and a load instruction using one of an index register and a base register loaded from a pointer variable are identified as potentially unsafe instructions;
   marking one or more potentially unsafe instructions in the code;
   identifying one or more unsafe instructions from the marked one or more potentially unsafe instructions in the code;
   inserting a protection barrier instruction into the code based at least in part on identifying the one or more unsafe instructions, wherein a first protection barrier instruction is inserted before the identified unsafe instructions in the code and a second protection barrier instruction is inserted after the identified unsafe instructions in the code; and
   translating the code responsive to inserting the protection barrier instruction.

2. The computer-implemented method of claim 1, wherein the protection barrier instruction is inserted prior to the identified unsafe instructions in the code, or after the identified unsafe instructions in the code.

3. The computer-implemented method of claim 1, wherein the insertion of the protection barrier instruction is based on at least one of a programming language, a platform type, or an architecture type.

4. The computer-implemented method of claim 1, wherein the protection barrier instruction prevents a side channel from monitoring data transferred between a cache and a memory.

5. The computer-implemented method of claim 1, further comprising identifying one or more instructions as safe instructions, wherein protection barrier instructions are not generated responsive to identifying safe instructions.

6. The computer-implemented method of claim 1, further comprising generating the protection barrier instruction as the code is being translated.

7. A system configured to generate executable code with protection barrier instructions, the system comprising:
   a storage medium, the storage medium being coupled to a processor;
   the processor configured to:
      analyze code to identify potentially unsafe instructions, wherein a load instruction using data in a table of contents (TOC) as a base register and a load instruction using one of an index register and a base register loaded from a pointer variable are identified as potentially unsafe instructions;
      mark one or more potentially unsafe instructions in the code;
      identify one or more unsafe instructions from the marked one or more potentially unsafe instructions in the code;
      insert a protection barrier instruction into the code based at least in part on identifying the one or more unsafe instructions, wherein a first protection barrier instruction is inserted before the identified unsafe instructions in the code and a second protection barrier instruction is inserted after the identified unsafe instructions in the code; and
      translate the code, responsive to inserting the protection barrier instruction.

8. The system of claim 7, wherein the processor is configured to insert the protection barrier instruction prior to the identified one or more unsafe instructions in the code or after the identified one or more unsafe instructions in the code.

9. The system of claim 7, wherein the insertion of the protection barrier instruction is based on at least one of a programming language, a platform type, or an architecture type.

10. The system of claim 7, wherein the protection barrier instruction prevents a side channel from monitoring data transferred between a cache and a memory.

11. The system of claim 7, wherein the processor is configured to identify one or more instructions as safe instructions, wherein protection barrier instructions are not generated responsive to identifying safe instructions.

12. The system of claim 7, wherein the processor is configured to generate the protection barrier instruction as the code is being translated.

13. A computer program product for generating executable code with protection barrier instructions, the computer program product comprising a computer-readable storage medium having program instructions embodied therewith, the program instructions executable by a processor to cause the processor to:
   analyze code to identify potentially unsafe instructions, wherein a load instruction using data in a table of contents (TOC) as a base register and a load instruction using one of an index register and a base register loaded from a pointer variable are identified as potentially unsafe instructions;
   mark one or more potentially unsafe instructions in the code;
   identify one or more unsafe instructions from the marked one or more potentially unsafe instructions in the code based at least in part on identifying the one or more unsafe instructions;
   insert a protection barrier instruction into the code, wherein a first protection barrier instruction is inserted before the identified unsafe instructions in the code and a second protection barrier instruction is inserted after the identified unsafe instructions in the code; and
   translate the code, responsive to inserting the protection barrier instruction.

14. The computer program product of claim 13, wherein the protection barrier instruction is inserted prior to the identified one or more unsafe instructions in the code or after the identified one or more unsafe instructions in the code.

15. The computer program product of claim 13, wherein the insertion of the protection barrier instruction is based on at least one of a programming language, a platform type, or an architecture type.

16. The computer program product of claim 13, wherein the protection barrier instruction prevents a side channel from monitoring data transferred between a cache and a memory.

17. The computer program product of claim 13, wherein the instructions are further executable by the processor to cause the processor to generate the protection barrier instruction as the code is being translated.

* * * * *